(12) United States Patent
Nguyen (10) Patent No.: US 11,909,127 B2
(45) Date of Patent: Feb. 20, 2024

(54) ANTENNA SYSTEM, CALIBRATION UNIT, AND CALIBRATION METHOD

(71) Applicant: NEC Corporation, Tokyo (JP)

(72) Inventor: Tung Nguyen, Tokyo (JP)

(73) Assignee: NEC CORPORATION, Tokyo (JP)

( * ) Notice: Subject to any disclaimer, the term of this patent is extended or adjusted under 35 U.S.C. 154(b) by 356 days.

(21) Appl. No.: 17/434,114

(22) PCT Filed: Jan. 27, 2020

(86) PCT No.: PCT/JP2020/002806
§ 371 (c)(1),
(2) Date: Aug. 26, 2021

(87) PCT Pub. No.: WO2020/174971
PCT Pub. Date: Sep. 3, 2020

(65) Prior Publication Data
US 2022/0140478 A1     May 5, 2022

(30) Foreign Application Priority Data

Feb. 28, 2019   (JP) ................................. 2019-037001

(51) Int. Cl.
*H04B 17/00* (2015.01)
*H01Q 3/26* (2006.01)
(Continued)

(52) U.S. Cl.
CPC ............. *H01Q 3/267* (2013.01); *H04B 17/12* (2015.01); *H04B 7/0413* (2013.01)

(58) Field of Classification Search
CPC .. H04B 17/12; H04B 17/0085; H04B 17/101; H04B 17/11; H04B 17/21; H01Q 3/267
See application file for complete search history.

(56) References Cited

U.S. PATENT DOCUMENTS 7,106,249 B2 * 9/2006 Kubo ................. H04B 17/0085
342/368
9,516,513 B2 * 12/2016 Sægrov ..................... G01S 5/12
(Continued)

FOREIGN PATENT DOCUMENTS

| EP | 1630976 A1 | 3/2006 |
|---|---|---|
| JP | 2015-037231 A | 2/2015 |
| WO | 2004/109952 A1 | 12/2004 |

OTHER PUBLICATIONS

Japanese Office Action for JP Application No. 2021-549724 dated Jul. 26, 2022 with English Translation.
(Continued)

*Primary Examiner* — Tuan Pham (57) ABSTRACT

A reference signal generator generates a reference signal having high auto-correlation. A delay unit delays the reference signal to generate delayed reference signals and outputs the reference signal and the delayed reference signals to the transmission units, respectively. A calibration network combines the output signals of the transmission units. An analyzer analyzes a correlation between a demodulated signal and the reference signal to determine variations of timing, amplitude and a phase of the output signal of each transmission unit. Each transmission unit calibrates the timing, amplitude and phase of the output signal based on a corresponding determination result.

20 Claims, 11 Drawing Sheets

(51) Int. Cl.
*H04B 17/12* (2015.01)
*H04B 7/0413* (2017.01)

(56) References Cited

U.S. PATENT DOCUMENTS

| | | |
|---|---|---|
| 2001/0016505 A1 | 8/2001 | Rexberg et al. |
| 2005/0239419 A1 | 10/2005 | Fudaba et al. |
| 2014/0354507 A1* | 12/2014 | Maca ................ H01Q 3/26 343/853 |
| 2016/0183209 A1 | 6/2016 | Inoue et al. |

OTHER PUBLICATIONS

International Search Report for PCT Application No. PCT/JP2020/002806, dated Mar. 17, 2020.
Tung Nguyen et al., "An Experimental Study of High-Capacity Link using Orbital Angular Momentum Mode Multiplexing in E-Band", International Symposium on Antennas and Propagation (ISAP), Jan. 28, 2019.

* cited by examiner

| | ADDED ERROR | | | SIMULATION RESULT | | |
|---|---|---|---|---|---|---|
| | Amplitude [dB] | Phase [degrees] | Delay [samples] | Amplitude [dB] | Phase [degrees] | Delay [samples] |
| CH1 | 0 | 0 | 0 | 0 | -0.02 | 0 |
| CH2 | 2 | 30 | 1 | 2.0082 | 30.07 | 1 |
| CH3 | 0 | 0 | 17 | 0 | -0.02 | 17 |
| CH4 | 1 | 8 | 0 | 1.0042 | 8.01 | 0 |
| CH5 | 0 | 0 | 0 | 0 | -0.02 | 0 |
| CH6 | 0 | 0 | 0 | 0 | -0.02 | 0 |
| CH7 | 0 | 0 | 0 | 0 | -0.02 | 0 |
| CH8 | 0 | 0 | 0 | 0.0003 | -0.02 | 0 |
| CH9 | 0 | 0 | 0 | 0 | -0.02 | 0 |
| CH10 | 0 | 0 | 0 | 0 | -0.02 | 0 |
| CH11 | 0 | 0 | 0 | 0.0003 | -0.02 | 0 |
| CH12 | 0 | 0 | 0 | 0.0003 | -0.02 | 0 |
| CH13 | 0 | 0 | 0 | 0.0003 | -0.02 | 0 |
| CH14 | 0 | 0 | 0 | 0 | -0.02 | 0 |
| CH15 | 0 | 0 | 0 | 0 | -0.02 | 0 |
| CH16 | 3 | 10 | 3 | 3.009 | 10.01 | 3 |

ANTENNA SYSTEM, CALIBRATION UNIT, AND CALIBRATION METHOD

This application is a National Stage Entry of PCT/JP2020/002806 filed on Jan. 27, 2020, which claims priority from Japanese Patent Application 2019-037001 filed on Feb. 28, 2019, the contents of all of which are incorporated herein by reference, in their entirety.

TECHNICAL FIELD

The present invention relates to an antenna system, a calibration unit, and a calibration method.

BACKGROUND ART

Development of the 5th generation mobile communication network (5G) has been proceeded to correspond to ever-growing demands of quality of services and exponentially escalating number of users and data. Ultra-high capacity backhaul and fronthaul links with the order of several of tens Gb/s for small cells will play a very important role in 5G network.

From the antenna point of view, some recent advanced technologies such as beam-forming/switching, spatial multiplexing (MIMO [multiple-input and multiple-output], massive MIMO, Orbital Angular Momentum (OAM) mode multiplexing), and spatial diversity have enabled the wireless industry to satisfy the above-mentioned demands. The Beam-forming/switching improves the signal-to-interference plus noise ratio (SINR) and frequency reuse in a cellular system, while spatial multiplexing multiples the network capacity without widening bandwidth.

These above-mentioned technologies can be often realized with an array antenna and digital signal processing (DSP). In the array antenna, the amplitude and phase differences along separated signal paths caused by hardware components (antenna elements, cables, analog/digital circuitry) may degrade a performance of the array antenna, and, hence it demises integrity of the communication system. Therefore, calibration is indispensable in order to minimize the amplitude and phase variations over separate signal paths. Additionally, when high modulation rates are used, it is necessary to precisely calibrate delay variation among those paths, since misalignment of timing on each antenna element at a receiving (Rx) side may degrade quality of beam composition and also impair the integrity of the communication system.

Thus, a calibration method for such antenna has been proposed (e.g. in PTL1). The N-elements array antenna includes N feedings and N feedings respectively supply signals to the N-elements, where N is an integer equal to or more than two. As described above, the amplitude, phase and delay variations over different paths may cause an undesired array pattern and degrade the communication system performance. These amplitude, phase, and delay variations may occur due to any of the hardware components along the transmission path, i.e. IF cables, baseband units, digital-analog converters, up-converters, loose connections, and antenna elements.

Generally, calibration is executed by a calibration network installed between the up-converters and the antennas. A simple calibration network is formed by N couplers and one combiner, where N is the number of channels and an integer equal to or more than two. Signals from different paths that are branched by the N couplers are combined by the combiner in the calibration network, the combined signals are received and separated by a receiver, and then separated signals fed back to the baseband units to extract amount of differences and compensate for the differences.

An orthogonal pilot pattern is frequently used for calibration so that the combined signal can be easily separated. Orthogonal signals are fed to the separate paths and then combined and received by the single receiver. The combined signals are then separated by the orthogonal code that is used to create the transmitted orthogonal signals, i.e. Hadamard code. The use of the orthogonal code can achieve high separation of the combined signals and thus provide high accuracy of the amplitude and phase estimation, under assumption that perfect timing alignment of all channels is established.

CITATION LIST

Patent Literature

PTL 1: US Patent Publication No. 2001/0016505

SUMMARY OF INVENTION

Technical Problem

However, in a transmission system that employs high speed modulation, delay variation among channels occurs and it leads to degrade accuracy of amplitude and phase estimation. Further, the phase of the channel may vary due to the calibration of the timing. Therefore, a technology capable of precisely calibrate the timing, amplitude and phase of each channel is required.

The present invention has been made in view of the aforementioned circumstances and aims to calibrate timing, amplitude and a phase of each of plural channels in an antenna system including a plurality of antenna elements.

Solution to Problems

A antenna system according to an aspect of the present invention includes: an antenna comprising a plurality of antenna elements; a plurality of transmission units, the transmission units modulating input signals and output the modulated signals as output signals to the antenna elements, respectively; a reference signal generator configured to generate a reference signal having high auto-correlation; a delay unit configured to delay the reference signal to generate delayed reference signals having delay amounts different from each other and to output the reference signal and the delayed reference signals to the transmission units, respectively; a calibration network configured to combines the output signals of the transmission units; and an analyzer configured to analyze a correlation between a signal obtained by demodulating a combined signal output from the calibration network and the reference signal to determine variations of timing, amplitude and a phase of the output signal of each transmission unit, and to notify the transmission units of determination results, in which each transmission unit calibrates the timing, amplitude and phase of the output signal based on a corresponding determination result.

A calibration unit according to an aspect of the present invention includes: a reference signal generator configured to generate a reference signal having high auto-correlation; a delay unit configured to delay the reference signal to generate delayed reference signals having delay amounts different from each other and to respectively output the reference signal and the delayed reference signals to transmission units, the transmission units respectively modulating input signals and output the modulated signals as output signals to the antenna elements; a calibration network configured to combines the output signals of the transmission units; and an analyzer configured to analyze a correlation between a signal obtained by demodulating a combined signal output from the calibration network and the reference signal to determine variations of timing, amplitude and a phase of the output signal of each transmission unit, and to notify the transmission units of determination results, in which each transmission unit calibrates the timing, amplitude and phase of the output signal based on a corresponding determination result.

A calibration method according to an aspect of the present invention includes: generating a reference signal having high auto-correlation; delaying the reference signal to generate delayed reference signals having delay amounts different from each other; outputting the reference signal and the delayed reference signals to transmission units, respectively, the transmission units respectively modulating input signals and output the modulated signals as output signals to the antenna elements; combining the output signals of the transmission units to generate a combined signal; and analyzing a correlation between a signal obtained by demodulating the combined signal and the reference signal to determine variations of timing, amplitude and a phase of the output signal of each transmission unit; notifying the transmission units of determination results, in which each transmission unit calibrates the timing, amplitude and phase of the output signal based on a corresponding determination result.

Advantageous Effects of Invention

According to the present invention, it is possible to calibrate timing, amplitude and a phase of each of plural channels in an antenna system including a plurality of antenna elements.

DESCRIPTION OF EMBODIMENTS

Exemplary embodiments of the present invention will be described below with reference to the drawings. In the drawings, the same elements are denoted by the same reference symbols, and thus a repeated description is omitted as needed.

First Exemplary Embodiment

Figure 1:
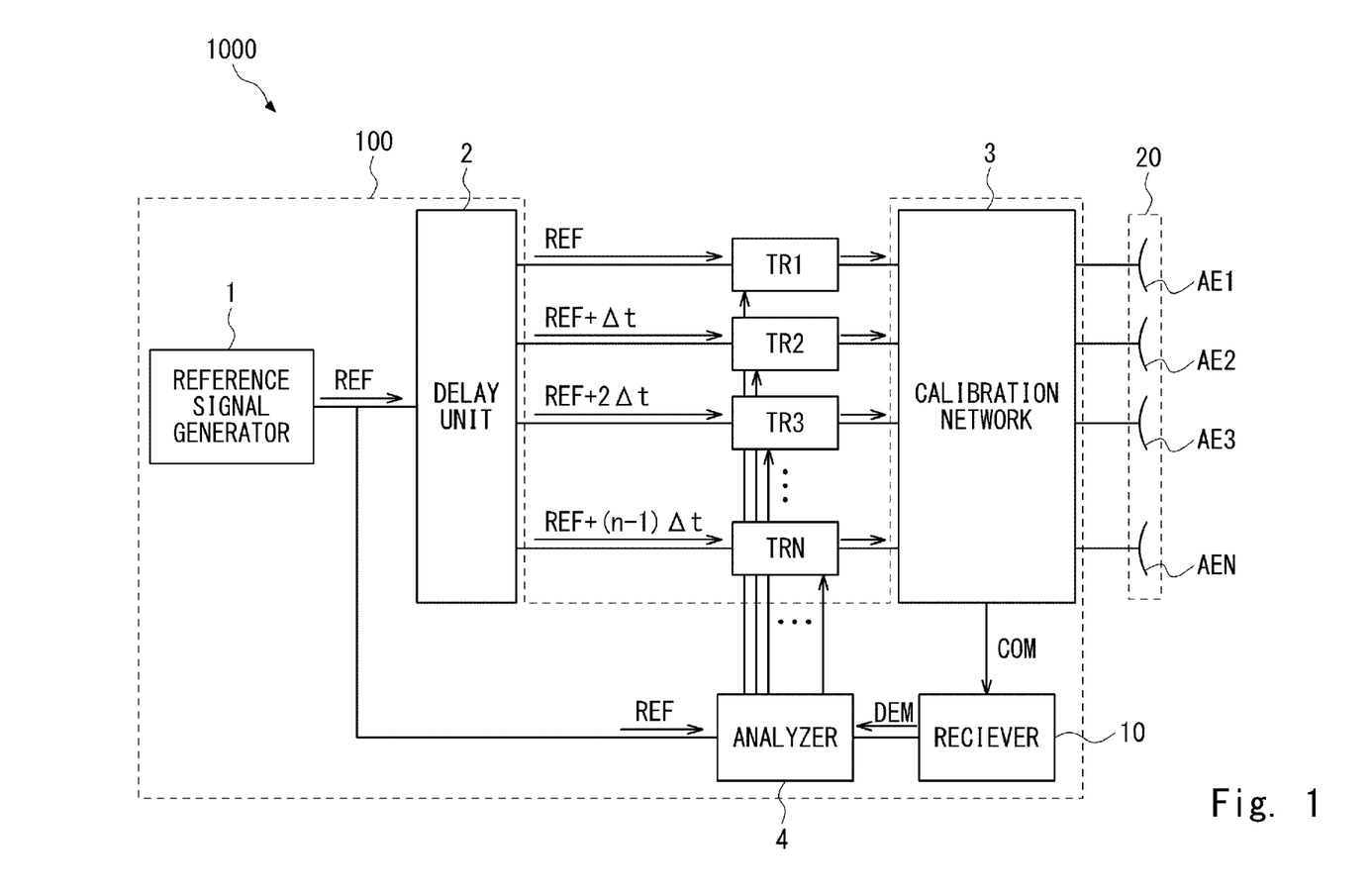
FIG. 1 illustrates a configuration of an antenna system according to a first exemplary embodiment.

A calibration of an array antenna according to a first exemplary embodiment will be described. In the present exemplary embodiment, characteristics of a pseudo noise (PN) sequence are used to generate a pilot pattern for the calibration. FIG. 1 illustrates a configuration of an antenna system 1000 according to the first exemplary embodiment. The antenna system 1000 includes an antenna array 20, a plurality of transmission units, and a calibration unit 100.

The array antenna 20 includes N antenna elements AE1 to AEN for transmitting signals of N channels, where N is an integer equal to or more than two. The antenna elements AE1 to AEN are connected to the transmission units TR1 to TRN, respectively. The transmission unit TRk includes a baseband unit BBk, a digital to analog converter (DAC) DACk, and an up converter UCk, where k is an integer from one to N. The baseband unit BBk generates a baseband signal from an input signal. The digital to analog converter DACk converts the baseband signal from a digital signal to an analog signal. The up converter UCk up-converts an input analog signal up to a frequency used for transmission from the antenna 20.

Figure 2:
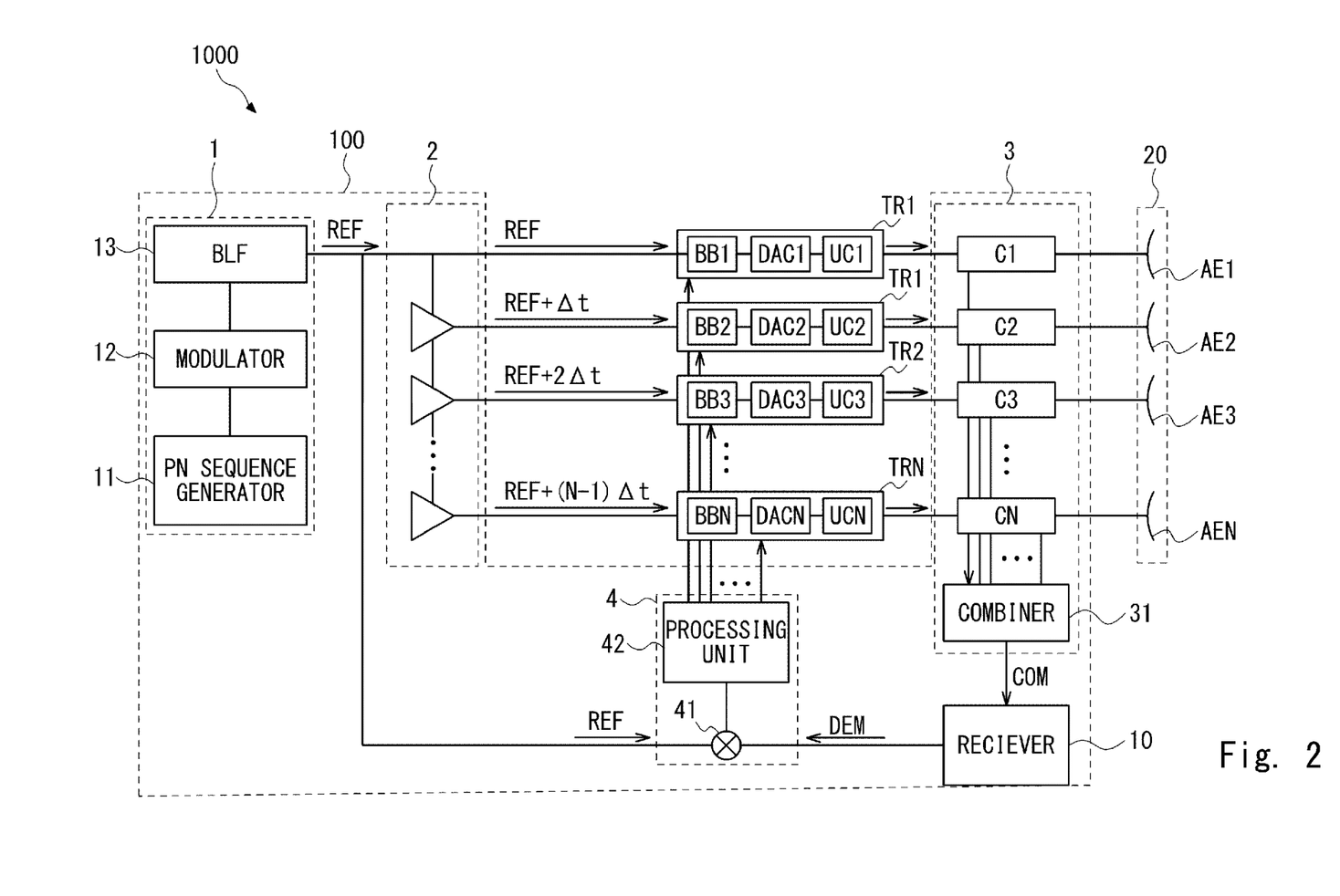
FIG. 2 illustrates the configuration of the antenna system according to the first exemplary embodiment in more detail.

The calibration unit 100 includes a reference signal generator 1, the delay unit 2, a calibration network 3, and an analyzer 4. FIG. 2 illustrates the configuration of the antenna system 1000 according to the first exemplary embodiment in more detail.

The reference signal generator 1 includes a PN sequence generator 11, a modulator 12, and a band limited filter 13. The PN sequence generator 11 generates the PN sequence. The modulator 12 modulates the PN sequence by performing Binary Phase Shift Keying (BPSK) mapping. The band limited filter 13 filters out undesirable components from the modulated signal to output a reference signal REF. The band limited filter 3 may be configured as a root raised cosine filter (RRCF).

The delay unit 2 delays the reference signal REF to output the pilot pattern that includes N PN sequences. The N PN sequences are respectively delayed by $(k-1)*\Delta t$, where $\Delta t$ is an interval between two neighbor PN sequences and k is an integer from one to N.

As illustrated in FIG. 2, the delay unit 2 includes N−1 delay elements connected in cascade. The N−1 delay elements are disposed for a second to N-th channels, respectively. The j-th delay element receives the reference signal delayed by $(j-1)*\Delta t$, delays the received signal by $\Delta t$, and outputs the delayed signal to the j-th channels. Further, when $2<=j<=N-2$, the j-th delay element outputs the delayed signal to the (j+1)-th delayed element. Thus, the N modulated signals delayed with different delay times are input to the N different channels, respectively. In sum, the modulated PN sequences delayed by 0, $\Delta t$, $2\Delta t$, ..., $(N-1)\Delta t$ are input to the first, second, third, ..., N-th channels, respectively.

The calibration network 3 includes couplers C1 to CN and combiner 31. The output signals of the transmission unit TR1 to TRN are branched by couplers C1 to CN, respectively. After that, the branched signals are combined by the combiner 31. The combined signal COM is received by a receiver 10 and the receiver 10 demodulates the combined signal COM and output the demodulated signal DEM to the analyzer 4.

The analyzer 4 includes a combiner 41 and a processing unit 42. The combiner 41 combines the reference signal REF and the demodulated signal DEM to obtain a correlation pattern between the demodulated signal DEM and the reference signal REF. The processing unit 42 analyzes the correlation to compensate the variations of timing, amplitude, and a phase of each channel.

Figure 3:
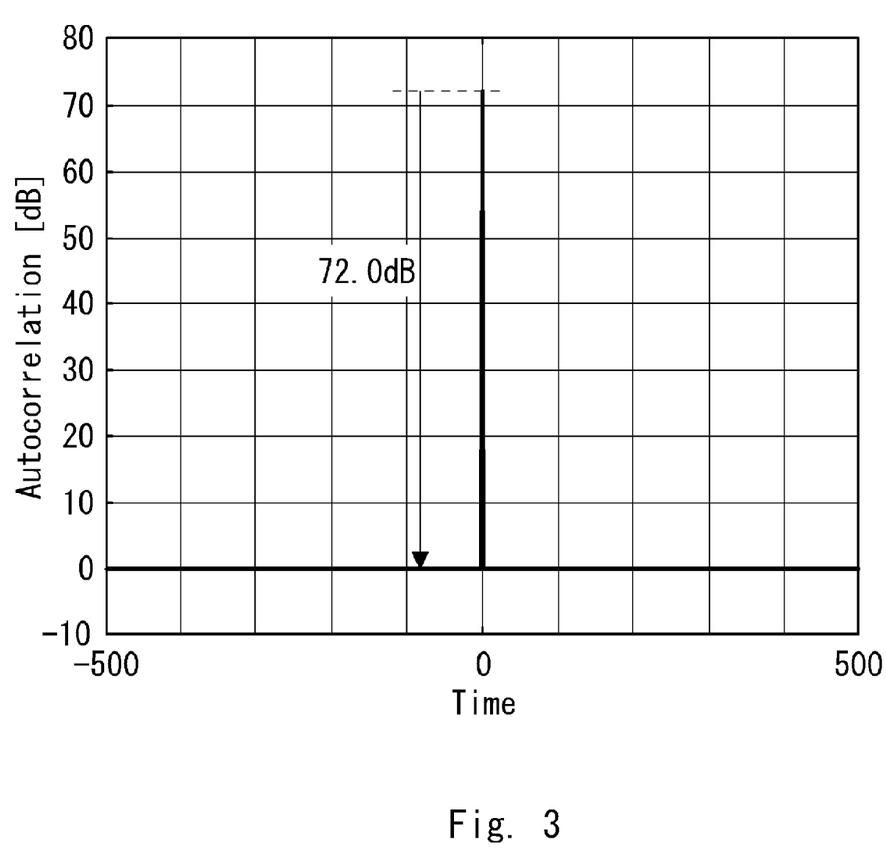
FIG. 3 illustrates high auto-correlation of a pseudo noise (PN) sequence having the order of 12.

The PN sequence with order of M and a length of $2^M-1$ can provide very high auto-correlation of $20*\log_{10}(2^M-1)$. For example, when the order of the PN sequence is 12, the length of the PN sequence is $2^{12}-1=4095$ and the high auto-correlation of that is $20*\log_{10}(4095)=72$ dB. FIG. 3 illustrates high auto-correlation of the PN sequence having the order of 12. In this embodiment, those characteristics of the PN sequence can be used for analyzing the variations of timing, amplitude, and a phase of each channel.

Figure 4:
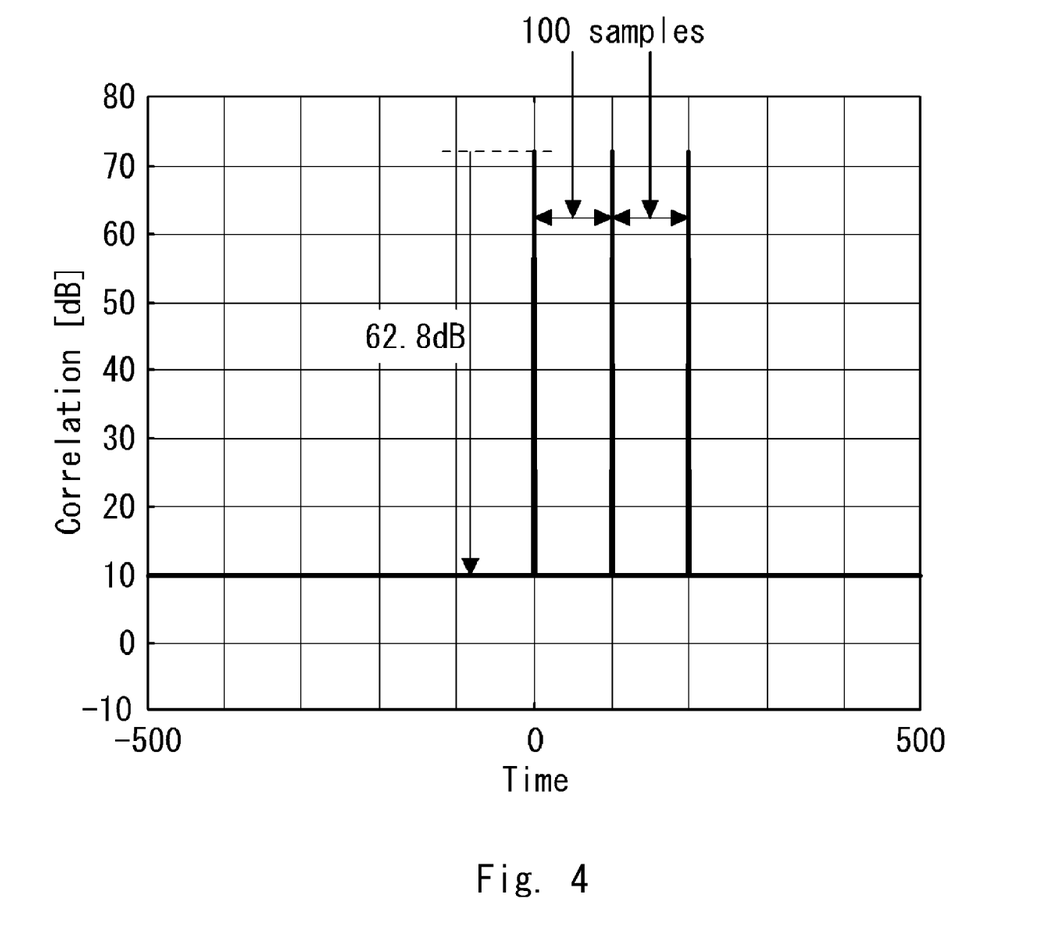
FIG. 4 illustrates an example of a power level of a correlation between a demodulated signal and a reference signal when the number of channel is three and an order of the PN sequence is 12.

Here, an example of a correlation between the demodulated signal DEM and the reference signal when the number of channels is three (N=3) and the order M is 12 (M=12). FIG. 4 illustrates a power level of the correlation between the demodulated signal DEM and the reference signal when the number of channels is three (N=3) and the order M is 12 (M=12). In, FIG. 4, two delayed signals are delayed by 100 and 200 samples, respectively. As illustrated in FIG. 4, two important results can be observed. The first result is that there are three peaks with regards to the timing of three signals passed through the three channels, i.e., 0, 100, and 200 samples away from the reference signal. The second result is that the level of these peaks is $20*\log_{10}((2^M-1)/N)=62.8$ dB, where M=12 (that denotes the order of the PN sequence) and N=3 (that denotes the number of channels). These results suggest that timing alignment (calibration) can be realized with high accuracy by generating the pilot pattern using the PN sequence and delayed reference signals as appropriate.

Further, according to the configuration, only one correlation that includes a plurality of peaks corresponding to the N channels (the N PN sequences) is required. In contrast, a plurality of correlations is needed because one correlation is obtained for each channel. Therefore, according to this configuration, it is possible to easily and effectively analyze the correlation.

Figure 5:
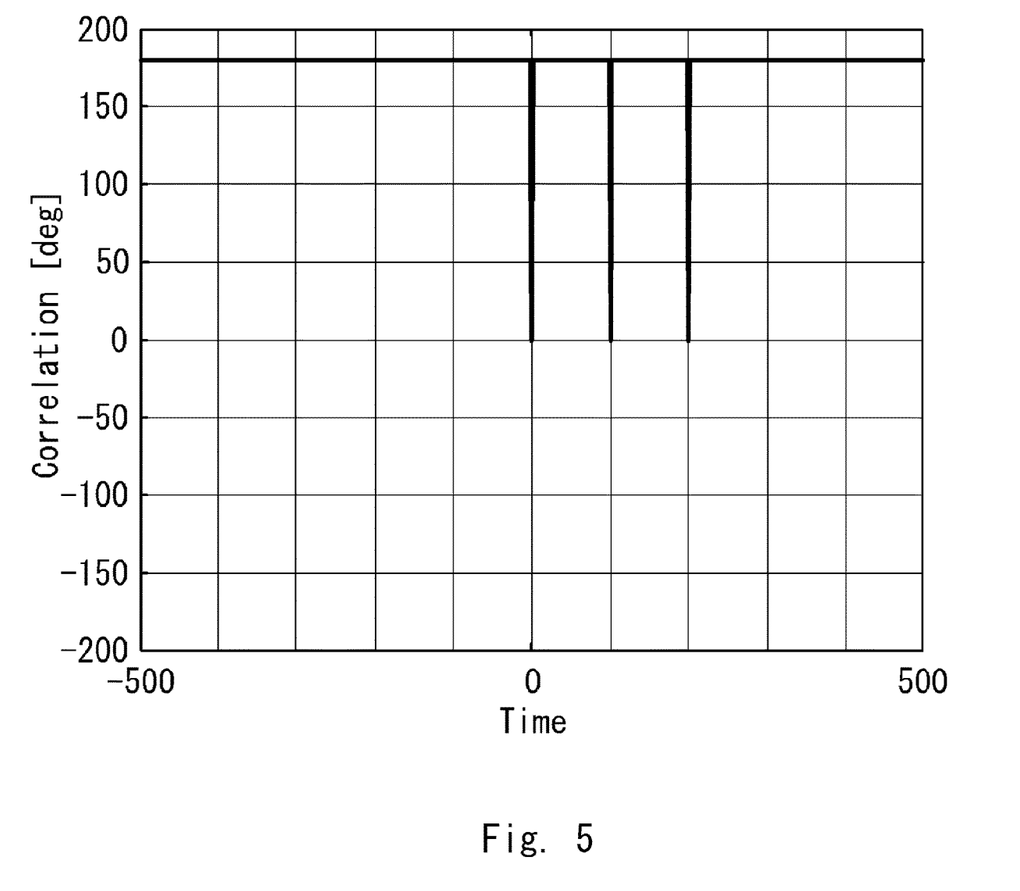
FIG. 5 illustrates an example of a phase of a correlation between the demodulated signal and the reference signal when the number of channel is three.

FIG. 5 illustrates the example of a phase of the correlation between the demodulated signal DEM and the reference signal when the number of channels is three (N=3). As illustrated in FIG. 5, the phases of the channels can be determined.

Figure 6:
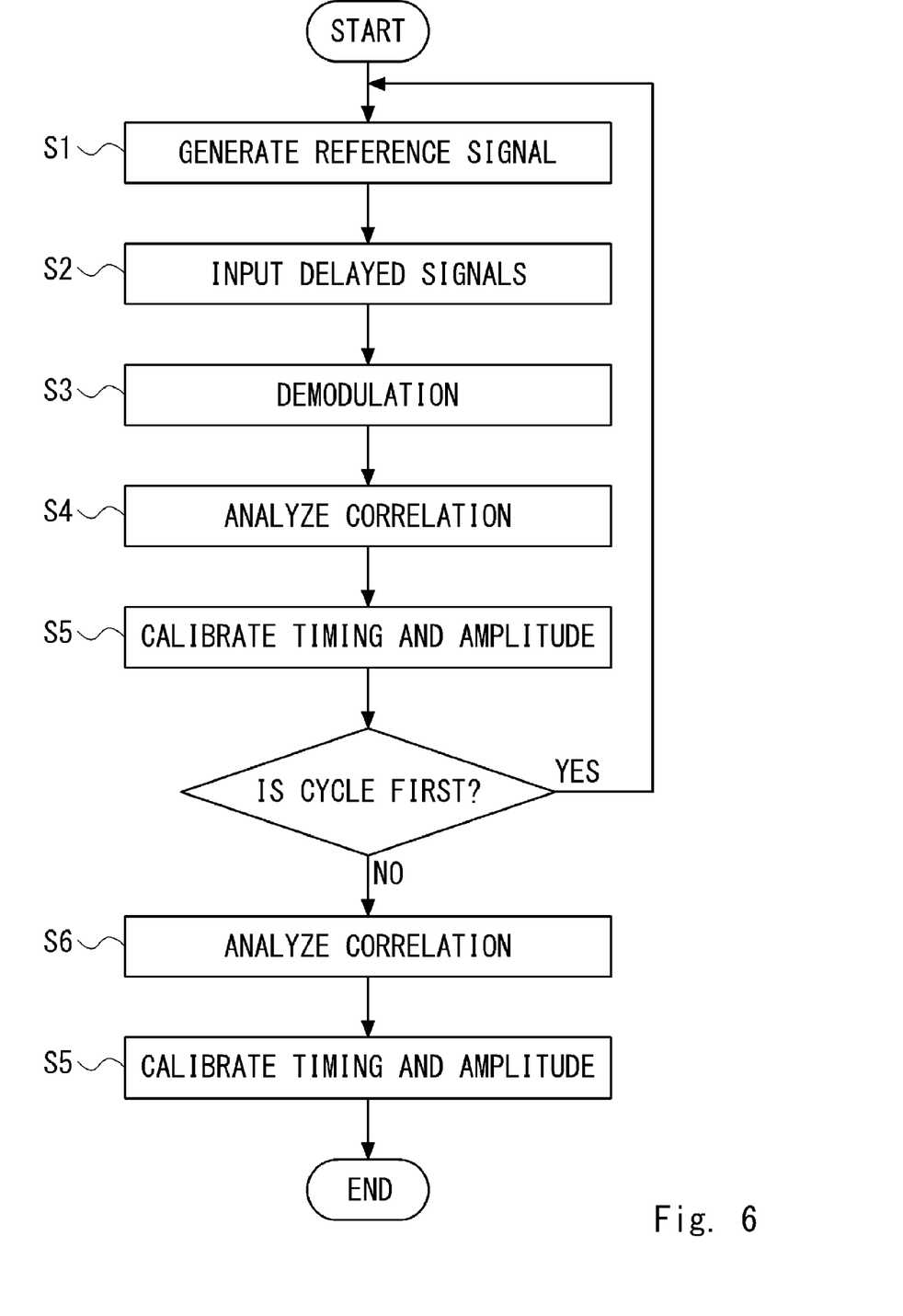
FIG. 6 illustrates a calibration procedure according to the first exemplary embodiment.

The calibration operation according to the first exemplary embodiment will be described. FIG. 6 illustrates a calibration procedure according to the first exemplary embodiment.

Step S1

The PN sequence generator generates the PN sequence with the order of M and the length of $2^M-1$. Hereinafter, the PN sequence generated here is referred to as an initial PN sequence. The initial PN sequence is modulated mapped in the BPSK manner and filtered to generate the reference signal REF. The reference signal is input to the delay unit 2 and then the delay unit 2 outputs N PN sequences as described above.

Step S2

The N PN sequences are respectively input to N channels, and the output signals from the N channels are branched and combined. The combined signal is output to the receiver.

Step S3

The receiver receives and demodulates the combined signal. Since the demodulation in the receiver can be performed with a general demodulation method, and a description of that will be omitted.

Step S4

The analyzer 4 combines the demodulated signal and the reference signal REF to obtain the correlation. The analyzer 4 analyzes the correlation. Specifically, the analyzer 4 detects the peaks corresponding to the N PN sequences. In the case of the first analysis cycle, the analyzer 4 can determine the variation of the timing of the k-th channel by observing the position of the corresponding peak Pk. The analyzer 4 can determine the variation of the amplitude of the k-th channel by observing the intensity of the corresponding peak Pk. The analyzer 4 outputs the first detection signal that indicates the variations of the timing and amplitude of each channel to each channel.

Step S5

Each of baseband units BB1 to BBN adjusts output timing and amplitude of the output signal based on the first detection signal. However, the phase of each channel may vary due to the calibration of the timing. Thus, the processing is gone back to Step S1 and the processing of Steps S1 to S4 is executed again to calibrate the phase of each channel.

Step S6

In the case of the second analysis cycle, the analyzer 4 can determine the variation of the phase of the k-th channel by observing the complex amplitude the corresponding peak Pk. The analyzer 4 outputs the second detection signal that indicates the variation of the phase of each channel to each channel.

Step S7

Each of baseband units BB1 to BBN adjusts the phase of the output signal based on the second detection signal.

According to the procedure described above, it is possible to precisely calibrate the timing, amplitude and phase of each channel by using the characteristic of the PN sequence. Further, it can be understood that a precise calibration for a system performing high speed modulation such as OAM described above can be achieved.

Figure 7:
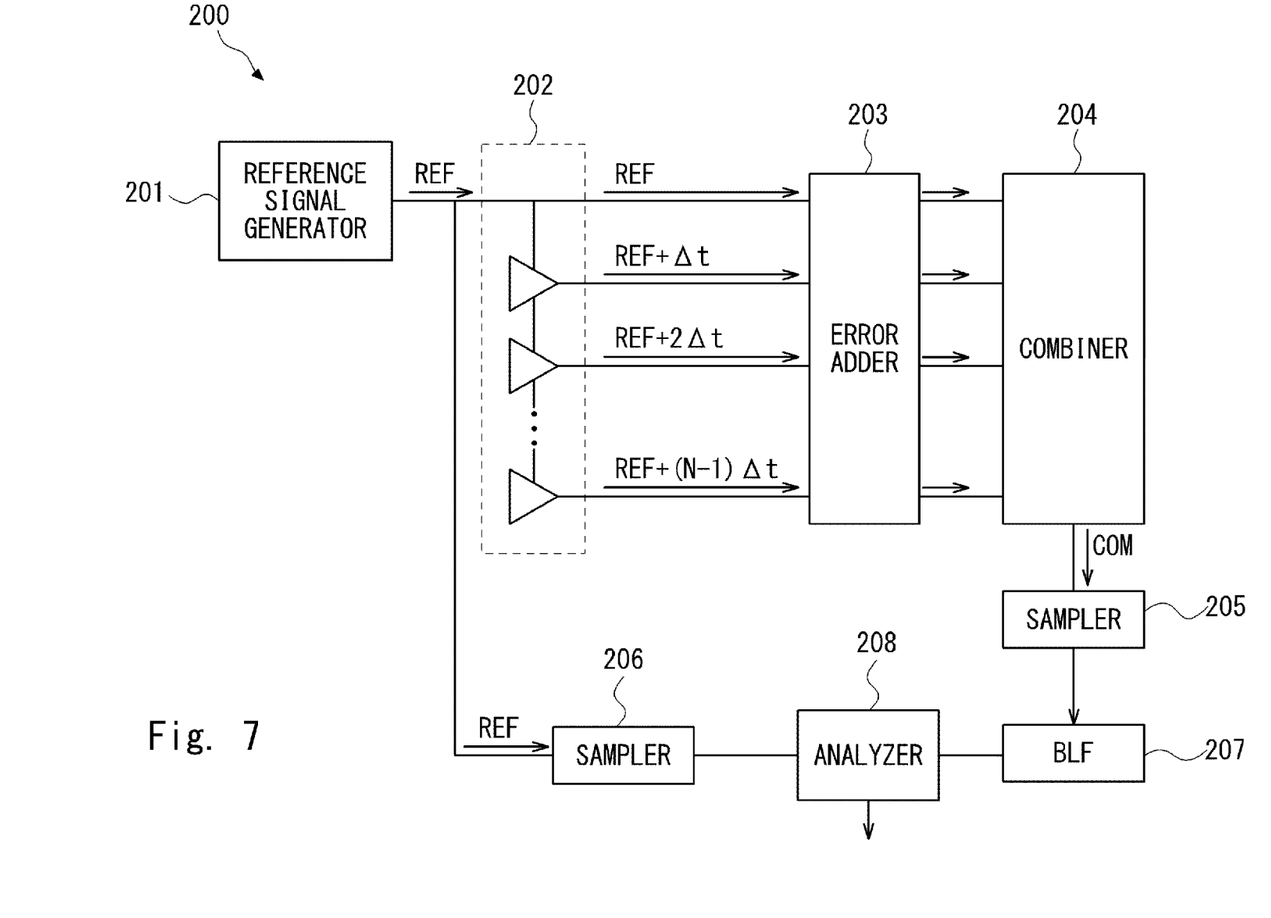
FIG. 7 illustrates a configuration of a verification model.

Next, an advantage of the calibration according to the first exemplary embodiment will be described using a verification model. FIG. 7 illustrates a configuration of the verification model 200. The verification model 200 includes a reference signal generator 201, a delay unit 202, an error adder 203, a combiner 204, samplers 205 and 206, a band limited filter 207, and an analyzer 208. The reference signal generator 201 and the delay unit 202 have the same configurations as the reference signal generator 1 and the delay unit 2. The error adder 203 adds some errors to the all or a part of the PN sequences for verifying the advantage of the calibration. The combiner 204 combines the PN sequences with the errors.

The sampler 205 oversamples the combined signal n times and the sampler 206 oversamples the reference signal REF n times, where n is an integer equal to or more than two. In this case, the number of the oversampling n is set to 128. Thus, one sample delay leads to 1/128 symbol delay.

The band limited filter 207 eliminates undesirable components from the sampled signal. The analyzer 208 combines the sampled reference signal and the sampled and filtered combined signal to obtain the correlation, and analyzes the correlation to determine the variations of the variations of the timing, amplitude and phase of each channel as in the case of the analyzer 4.

Figure 8:
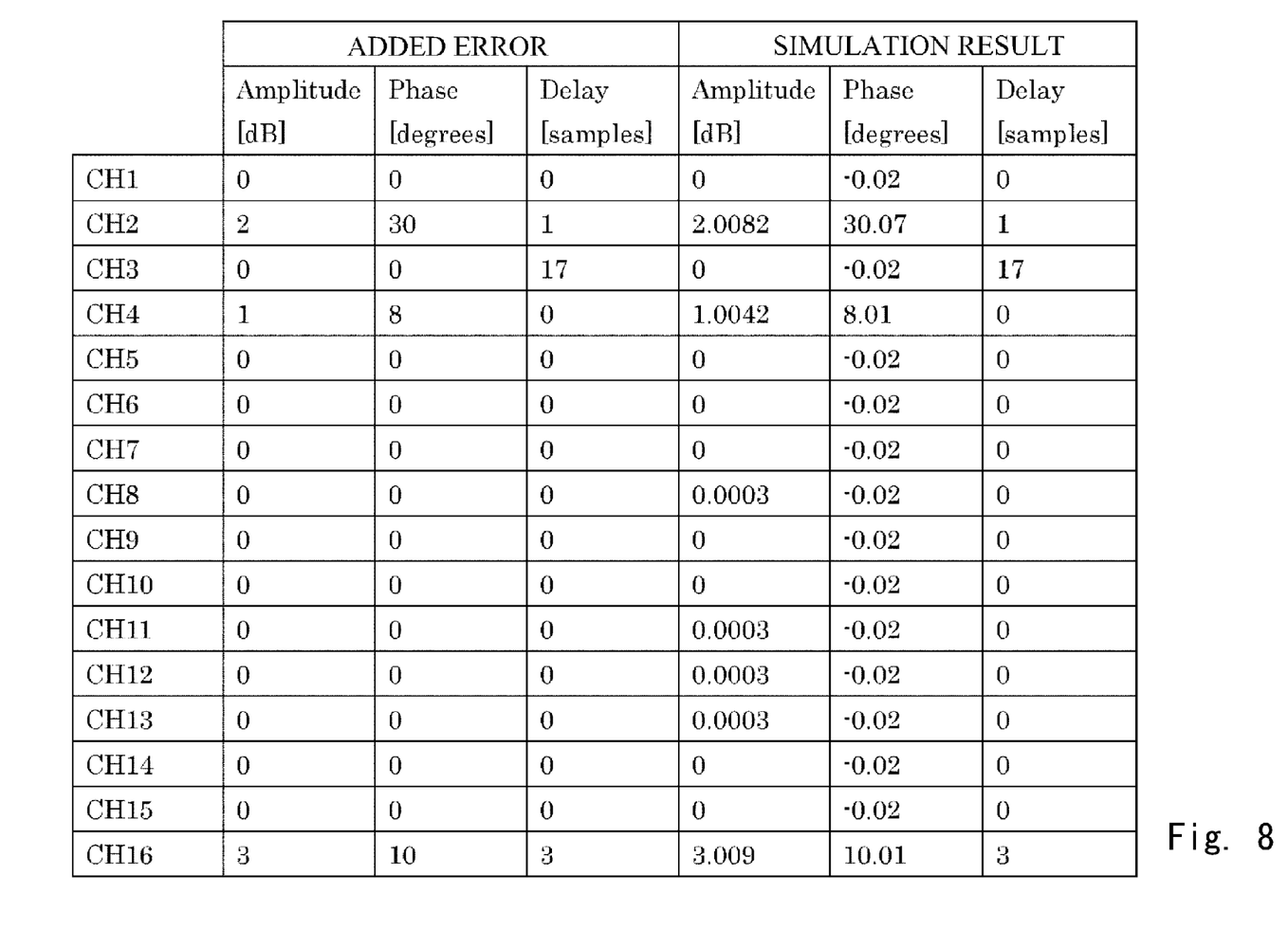
FIG. 8 illustrates errors added to the PN sequences and a simulation result.

Here, simulation will be carried out using the verification model 200. FIG. 8 illustrates errors added to the PN sequences and a simulation result.

Figure 9:
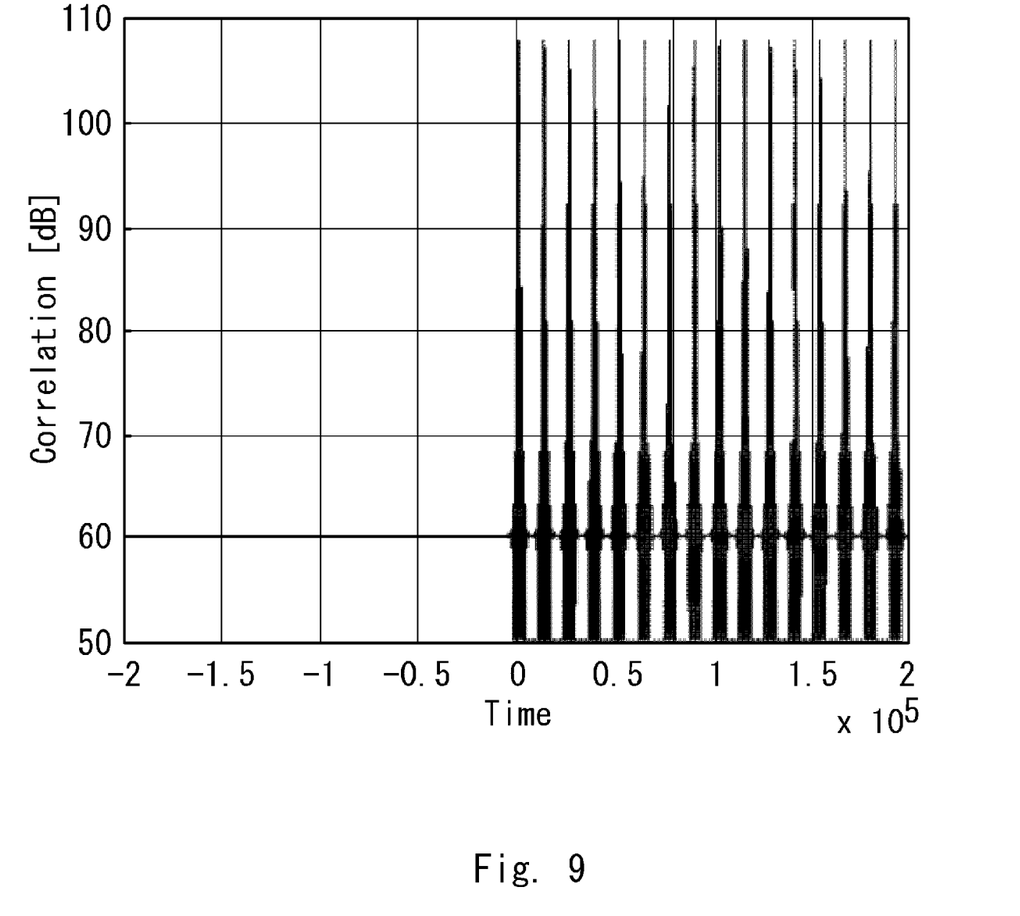
FIG. 9 illustrates a power level of a correlation between a received signal and a reference signal that are obtained by the simulation when the order of PN sequence is 12 and the number of channels is 16.

FIG. 9 illustrates a correlation of power level obtained by the simulation when the order of PN sequence is 12 (M=12) and the number of channels is 16 (N=16). In this case, there are 16 peaks along the time axis from t=0.

Figure 10:
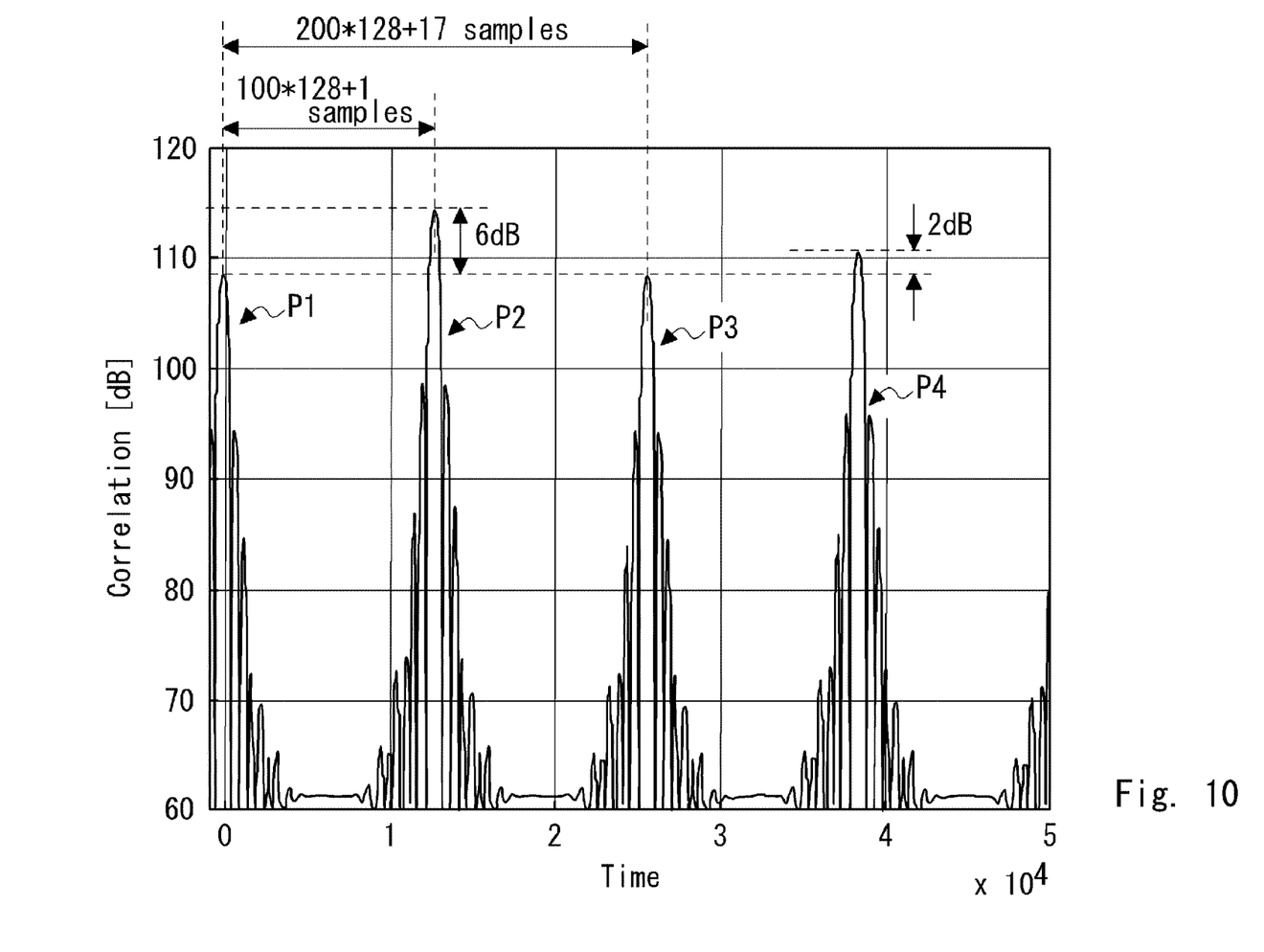
FIG. 10 illustrates the correlation in FIG. 8 that is partially expanded along a time axis.

FIG. 10 illustrates the correlation in FIG. 8 that is partially expanded along the time axis. As illustrated in FIG. 8, it can be understood the second peak P2 and third peak P3 are distant from the first peak P1 corresponding to the reference signal REF or the 1st channel by 128001 and 256017 samples, respectively. This means the second peak P2 and third peak P3 are lagging from $\frac{1}{128}$ and $\frac{17}{128}$ from the first peak, respectively. Thus, the analyzer 208 can determine the variation of the timing. Further, it can be determined that the amplitude of the second peak P2 varies by 8 dB and the amplitude of the fourth peak P4 varies by 2 dB from the correlation.

Figure 11:
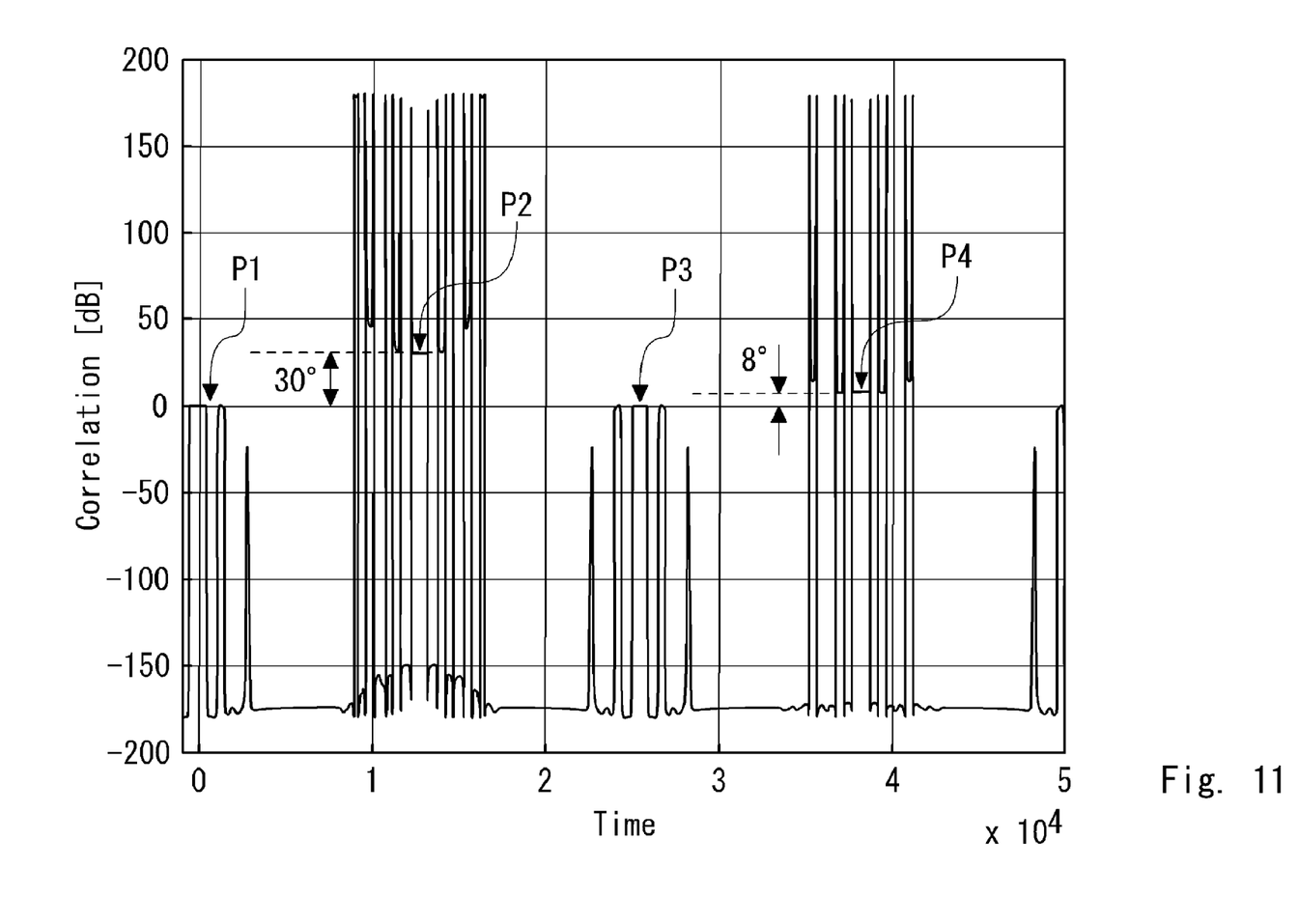
FIG. 11 illustrates a phase of the correlation corresponding to the expanded part in FIG. 10.

FIG. 11 illustrates a phase of the correlation corresponding to the expanded part in FIG. 10. As illustrated in FIG. 11, it can be understood that the phases jump in the second peak P2 and fourth peak P4 by 30 and 8 degrees, respectively. Thus, the analyzer 208 can determine the variation of the phase.

As described above, it can be understood that this verification model 200 can appropriately determine the variations of the timing, amplitude, and phase of each channel. That is, the calibration system 1000, which has the substantially same configuration as the verification model 200 can also determine the variations the timing, amplitude, and phase, and calibrate the all channels to precisely suppress these variations.

Other Exemplary Embodiments

Note that the present invention is not limited to the above exemplary embodiments and can be modified as appropriate without departing from the scope of the invention. For example, the PN sequence is used in the exemplary embodiment described above. However, it is merely an example. A signal having the high auto-correlation such as Gold sequence can be appropriately used for generating the reference signal.

In the exemplary embodiment described above, the configuration in which the antenna system includes the receiver has been described. However, it is merely an example. The receiver may be included in another antenna system other than the antenna system according to the exemplary embodiment described above. In this case, the receiver in the other antenna system can feed back the determination result to the transmitters in the antenna system according to the exemplary embodiment described above.

While the present invention has been described above with reference to exemplary embodiments, the present invention is not limited to the exemplary embodiments stated above.

(Supplementary note 1) An antenna system including: an antenna including a plurality of antenna elements; a plurality of transmission units, the transmission units modulating input signals and output the modulated signals as output signals to the antenna elements, respectively; a reference signal generator configured to generate a reference signal having high auto-correlation; a delay unit configured to delay the reference signal to generate delayed reference signals having delay amounts different from each other and to output the reference signal and the delayed reference signals to the transmission units, respectively; a calibration network configured to combines the output signals of the transmission units; and an analyzer configured to analyze a correlation between a signal obtained by demodulating a combined signal output from the calibration network and the reference signal to determine variations of timing, amplitude and a phase of the output signal of each transmission unit, and to notify the transmission units of determination results, in which each transmission unit calibrates the timing, amplitude and phase of the output signal based on a corresponding determination result.

(Supplementary note 2) The antenna system according to the supplementary note 1, wherein the reference signal having high auto-correlation is a pseudo noise (PN) sequence.

(Supplementary note 3) The antenna system according to the supplementary note 2, further including a receiver configured to demodulate the combined signal and output the demodulated signal to the analyzer.

(Supplementary note 4) The antenna system according to the supplementary note 2, in which a receiver disposed in another antenna system demodulates the combined signal and output the demodulated signal to the analyzer.

(Supplementary note 5) The antenna system according to any one of the supplementary notes 2 to 4, in which the delay unit delays the reference signal to generate N−1 PN sequences that are delayed by Δt to (N−1)*Δt, respectively, where N is an integer equal to or more than two, and the reference signal and the N−1 PN sequences are output to N transmission units, respectively.

(Supplementary note 6) The antenna system according to any one of the supplementary notes 2 to 5, in which the analyzer determines the timing of the PN sequence based on a position along a time axis of a corresponding peak in a power level of the correlation, determines the amplitude of the PN sequence based on a power level of the corresponding peak in the power level of the correlation, and determines the phase of the PN sequence based on a jump of a corresponding peak in a phase of the correlation.

(Supplementary note 7) The antenna system according to the supplementary note 6, in which the timing and amplitude of each PN sequence are calibrated based on the power level of the correlation between the received signal and reference signal that is firstly obtained, and the phase of each PN sequence is calibrated based on the phase of the correlation between the received signal and reference signal that is obtained after the timing and amplitude of each PN sequence have been calibrated.

(Supplementary note 8) An calibration unit including: a reference signal generator configured to generate a reference signal having high auto-correlation; a delay unit configured to delay the reference signal to generate delayed reference signals having delay amounts different from each other and to respectively output the reference signal and the delayed reference signals to transmission units, the transmission units respectively modulating input signals and output the modulated signals as output signals to the antenna elements; a calibration network configured to combines the output signals of the transmission units; and an analyzer configured to analyze a correlation between a signal obtained by demodulating a combined signal output from the calibration network and the reference signal to determine variations of timing, amplitude and a phase of the output signal of each transmission unit, and to notify the transmission units of determination results, in which each transmission unit calibrates the timing, amplitude and phase of the output signal based on a corresponding determination result.

(Supplementary note 9) The calibration unit according to the supplementary note 8, in which the reference signal having high auto-correlation is a pseudo noise (PN) sequence.

(Supplementary note 10) The calibration unit according to the supplementary note 9, in which the antenna elements, the transmission units and a receiver configured to demodulate the combined signal and output the demodulated signal to the analyzer are included in an antenna system.

(Supplementary note 11) The calibration unit according to the supplementary note 9, in which the antenna elements and the transmission units are included in a first antenna system, and a receiver configured to demodulate the combined signal and output the demodulated signal to the analyzer are included in a second antenna system that is different from the first antenna system.

(Supplementary note 12) The calibration unit according to any one of the supplementary notes 9 to 11, in which the delay unit delays the reference signal to generate N−1 PN sequences that are delayed by $\Delta t$ to $(N-1)*\Delta t$, respectively, where N is an integer equal to or more than two, and the reference signal and the N−1 PN sequences are output to N transmission units, respectively.

(Supplementary note 13) The calibration unit according to any one of the supplementary notes 9 to 12, in which the analyzer determines the timing of the PN sequence based on a position along a time axis of a corresponding peak in a power level of the correlation, determines the amplitude of the PN sequence based on a power level of the corresponding peak in the power level of the correlation, and determines the phase of the PN sequence based on a jump of a corresponding peak in a phase of the correlation.

(Supplementary note 14) The calibration unit according to the supplementary note 13, in which the timing and amplitude of each PN sequence are calibrated based on the power level of the correlation between the received signal and reference signal that is firstly obtained, and the phase of each PN sequence is calibrated based on the phase of the correlation between the received signal and reference signal that is obtained after the timing and amplitude of each PN sequence have been calibrated.

(Supplementary note 15) A calibration method including: generating a reference signal having high auto-correlation; delaying the reference signal to generate delayed reference signals having delay amounts different from each other; outputting the reference signal and the delayed reference signals to transmission units, respectively, the transmission units respectively modulating input signals and output the modulated signals as output signals to the antenna elements; combining the output signals of the transmission units to generate a combined signal; and analyzing a correlation between a signal obtained by demodulating the combined signal and the reference signal to determine variations of timing, amplitude and a phase of the output signal of each transmission unit; notifying the transmission units of determination results, in which each transmission unit calibrates the timing, amplitude and phase of the output signal based on a corresponding determination result.

(Supplementary note 16) The calibration method according to the supplementary note 15, in which the reference signal having high auto-correlation is a pseudo noise (PN) sequence.

(Supplementary note 17) The calibration method according to the supplementary note 16, in which the antenna elements, the transmission units and a receiver configured to demodulate the combined signal and output the demodulated signal to the analyzer are included in an antenna system.

(Supplementary note 18) The calibration method according to the supplementary note 16, in which the antenna elements and the transmission units are included in a first antenna system, and a receiver configured to demodulate the combined signal and output the demodulated signal to the analyzer are included in a second antenna system that is different from the first antenna system.

(Supplementary note 19) The calibration method according to any one of the supplementary notes 16 to 18, in which the reference signal is delayed to generate N−1 PN sequences that are delayed by $\Delta t$ to $(N-1)*\Delta t$, respectively, where N is an integer equal to or more than two, and the reference signal and the N−1 PN sequences are output to N transmission units, respectively.

(Supplementary note 20) The calibration method according to any one of the supplementary notes 16 to 19, in which the timing of the PN sequence is determined based on a position along a time axis of a corresponding peak in a power level of the correlation, the amplitude of the PN sequence is determined based on a power level of the corresponding peak in the power level of the correlation, and the phase of the PN sequence is determined based on a jump of a corresponding peak in a phase of the correlation.

(Supplementary note 21) The calibration method according to the supplementary note 20, in which the timing and amplitude of each PN sequence are calibrated based on the power level of the correlation between the received signal and reference signal that is firstly obtained, and the phase of each PN sequence is calibrated based on the phase of the correlation between the received signal and reference signal that is obtained after the timing and amplitude of each PN sequence have been calibrated.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2019-37001, filed on Feb. 28, 2019, the disclosure of which is incorporated herein in its entirety by reference.

REFERENCE SIGNS LIST 1, 201 REFERENCE SIGNAL GENERATORS
2, 202 DELAY UNITS
3 CALIBRATION NETWORK
4, 208 ANALYZERS
10 RECEIVER
11 PN SEQUENCE GENERATOR
12 MODULATOR
13, 207 BAND LIMITED FILTERS
31, 41, 204 COMBINERS
42 PROCESSING UNIT
100 CALIBRATION UNIT
200 VERIFICATION MODEL
205, 206 SAMPLERS
1000 ANTENNA SYSTEM
BB1 TO BBN BASEBAND UNITS
DAC1 TO DACN DIGITAL TO ANALOG CONVERTERS
TR1 TO TRN TRANSMISSION UNITS
UC1 TO UCN UP CONVERTERS

What is claimed is:

1. An antenna system comprising:
an antenna comprising a plurality of antenna elements;
a plurality of transmission units, the transmission units modulating input signals and output the modulated signals as output signals to the antenna elements, respectively;
a reference signal generator configured to generate a reference signal having high auto-correlation;
a delay unit configured to delay the reference signal to generate delayed reference signals having delay amounts different from each other and to output the reference signal and the delayed reference signals to the transmission units, respectively;
a calibration network configured to combines the output signals of the transmission units; and
an analyzer configured to analyze a correlation between a signal obtained by demodulating a combined signal output from the calibration network and the reference signal to determine variations of timing, amplitude and a phase of the output signal of each transmission unit, and to notify the transmission units of determination results, wherein
each transmission unit calibrates the timing, amplitude and phase of the output signal based on a corresponding determination result.

2. The antenna system according to claim 1, wherein the reference signal having high auto-correlation is a pseudo noise (PN) sequence.

3. The antenna system according to claim 2, further comprising a receiver configured to demodulate the combined signal and output the demodulated signal to the analyzer.

4. The antenna system according to claim 2, wherein
a receiver disposed in another antenna system demodulates the combined signal and output the demodulated signal to the analyzer.

5. The antenna system according to claim 2, wherein
the delay unit delays the reference signal to generate N−1 PN sequences that are delayed by Δt to (N−1)*fit, respectively, where N is an integer equal to or more than two, and
the reference signal and the N−1 PN sequences are output to N transmission units, respectively.

6. The antenna system according to claim 2, wherein
the analyzer determines the timing of the PN sequence based on a position along a time axis of a corresponding peak in a power level of the correlation, determines the amplitude of the PN sequence based on a power level of the corresponding peak in the power level of the correlation, and determines the phase of the PN sequence based on a jump of a corresponding peak in a phase of the correlation.

7. The antenna system according claim 6, wherein
the timing and amplitude of each PN sequence are calibrated based on the power level of the correlation between the received signal and reference signal that is firstly obtained, and
the phase of each PN sequence is calibrated based on the phase of the correlation between the received signal and reference signal that is obtained after the timing and amplitude of each PN sequence have been calibrated.

8. An calibration unit comprising:
a reference signal generator configured to generate a reference signal having high auto-correlation;
a delay unit configured to delay the reference signal to generate delayed reference signals having delay amounts different from each other and to respectively output the reference signal and the delayed reference signals to transmission units, the transmission units respectively modulating input signals and output the modulated signals as output signals to the antenna elements;
a calibration network configured to combines the output signals of the transmission units; and
an analyzer configured to analyze a correlation between a signal obtained by demodulating a combined signal output from the calibration network and the reference signal to determine variations of timing, amplitude and a phase of the output signal of each transmission unit, and to notify the transmission units of determination results, wherein
each transmission unit calibrates the timing, amplitude and phase of the output signal based on a corresponding determination result.

9. The calibration unit according to claim 8, wherein the reference signal having high auto-correlation is a pseudo noise (PN) sequence.

10. The calibration unit according to claim 9, wherein the antenna elements, the transmission units and a receiver configured to demodulate the combined signal and output the demodulated signal to the analyzer are included in an antenna system.

11. The calibration unit according to claim 9, wherein
the antenna elements and the transmission units are included in a first antenna system, and
a receiver configured to demodulate the combined signal and output the demodulated signal to the analyzer are included in a second antenna system that is different from the first antenna system.

12. The calibration unit according to claim 9, wherein
the delay unit delays the reference signal to generate N−1 PN sequences that are delayed by Δt to (N−1)*fit, respectively, where N is an integer equal to or more than two, and
the reference signal and the N−1 PN sequences are output to N transmission units, respectively.

13. The calibration unit according to claim 9, wherein
the analyzer determines the timing of the PN sequence based on a position along a time axis of a corresponding peak in a power level of the correlation, determines the amplitude of the PN sequence based on a power level of the corresponding peak in the power level of the correlation, and determines the phase of the PN sequence based on a jump of a corresponding peak in a phase of the correlation.

14. The calibration unit according to claim 13, wherein
the timing and amplitude of each PN sequence are calibrated based on the power level of the correlation between the received signal and reference signal that is firstly obtained, and
the phase of each PN sequence is calibrated based on the phase of the correlation between the received signal and reference signal that is obtained after the timing and amplitude of each PN sequence have been calibrated.

15. A calibration method comprising:
generating a reference signal having high auto-correlation;
delaying the reference signal to generate delayed reference signals having delay amounts different from each other;

outputting the reference signal and the delayed reference signals to transmission units, respectively, the transmission units respectively modulating input signals and output the modulated signals as output signals to the antenna elements;

combining the output signals of the transmission units to generate a combined signal; and analyzing a correlation between a signal obtained by demodulating the combined signal and the reference signal to determine variations of timing, amplitude and a phase of the output signal of each transmission unit;

notifying the transmission units of determination results, wherein each transmission unit calibrates the timing, amplitude and phase of the output signal based on a corresponding determination result.

16. The calibration method according to claim 15, wherein the reference signal having high auto-correlation is a pseudo noise (PN) sequence.

17. The calibration method according to claim 16, wherein the antenna elements, the transmission units and a receiver configured to demodulate the combined signal and output the demodulated signal to the analyzer are included in an antenna system.

18. The calibration method according to claim 16, wherein the antenna elements and the transmission units are included in a first antenna system, and a receiver configured to demodulate the combined signal and output the demodulated signal to the analyzer are included in a second antenna system that is different from the first antenna system.

19. The calibration method according to claim 16, wherein the reference signal is delayed to generate N−1 PN sequences that are delayed by $\Delta t$ to $(N-1)*\Delta t$, respectively, where N is an integer equal to or more than two, and the reference signal and the N−1 PN sequences are output to N transmission units, respectively.

20. The calibration method according to claim 16, wherein the timing of the PN sequence is determined based on a position along a time axis of a corresponding peak in a power level of the correlation, the amplitude of the PN sequence is determined based on a power level of the corresponding peak in the power level of the correlation, and the phase of the PN sequence is determined based on a jump of a corresponding peak in a phase of the correlation.

* * * * *